United States Patent
Qin et al.

(10) Patent No.: US 11,463,226 B2
(45) Date of Patent: Oct. 4, 2022

(54) RESOURCE INDICATION METHOD AND COMMUNICATIONS DEVICE

(71) Applicant: HUAWEI TECHNOLOGIES CO., LTD., Guangdong (CN)

(72) Inventors: Yi Qin, Kista (SE); Zhongfeng Li, Munich (DE); Yi Ren, Shenzhen (CN); Zhihang Li, Shenzhen (CN); Liuliu Ji, Shanghai (CN); Jian Luo, Munich (DE)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 53 days.

(21) Appl. No.: 16/670,188

(22) Filed: Oct. 31, 2019

(65) Prior Publication Data
US 2020/0067687 A1 Feb. 27, 2020

Related U.S. Application Data

(63) Continuation of application No. PCT/CN2018/082126, filed on Apr. 8, 2018.

(30) Foreign Application Priority Data

May 2, 2017 (CN) .......................... 201710301485.1

(51) Int. Cl.
*H04L 5/00* (2006.01)
*H04B 7/155* (2006.01)
(Continued)

(52) U.S. Cl.
CPC ....... *H04L 5/0092* (2013.01); *H04B 7/15528* (2013.01); *H04L 5/0005* (2013.01);
(Continued)

(58) Field of Classification Search
CPC . H04L 5/0092; H04L 5/0005; H04B 7/15528; H04W 72/0406; H04W 72/0446; H04W 72/1263
(Continued)

(56) References Cited

U.S. PATENT DOCUMENTS 8,670,386 B2 * 3/2014 Bai ....................... H04L 5/0007
370/328
8,755,324 B2 * 6/2014 Yu ....................... H04W 72/085
370/315
(Continued)

FOREIGN PATENT DOCUMENTS

CN 101867944 A 10/2010
CN 103843432 A 6/2014
(Continued)

OTHER PUBLICATIONS

R1-1706115.pdf (Year: 2017).*
Huawei: "TP Reiay RF architecture",3GPP Draft; R4-112778, May 5, 2011 (May 5, 2011),XP050502782,total 2 pages.

*Primary Examiner* — Yemane Mesfin
*Assistant Examiner* — Intekhaab A Siddiquee
(74) *Attorney, Agent, or Firm* — Womble Bond Dickinson (US) LLP

(57) ABSTRACT

This application describes a resource indication method and a communications device. A resource indication method may include sending, by a first device, first indication information to a second device in an $n^{th}$ time unit, where the first indication information indicate a first time domain resource of a first link or a second link in an $(n+k_0)^{th}$ time unit to an $(n+k_1)^{th}$ time unit. In the method, the first link is a link between the first device and the second device, the second link is a link between the second device and a third device, $k_0$ is an integer greater than or equal to 0 and less than or equal to $k_1$, and $k_1$ is an integer.

16 Claims, 7 Drawing Sheets

(51) Int. Cl.
*H04W 72/04* (2009.01)
*H04W 72/12* (2009.01)

(52) U.S. Cl.
CPC ... *H04W 72/0406* (2013.01); *H04W 72/0446* (2013.01); *H04W 72/1263* (2013.01)

(58) Field of Classification Search
USPC ........................................................ 370/329
See application file for complete search history.

(56) References Cited

U.S. PATENT DOCUMENTS

| | | | | |
|---|---|---|---|---|
| 8,811,262 | B2* | 8/2014 | Chung | H04W 72/0453 370/315 |
| 10,206,232 | B2* | 2/2019 | Novlan | H04W 76/12 |
| 2010/0135238 | A1 | 6/2010 | Sadri et al. | |
| 2011/0103292 | A1* | 5/2011 | Pasad | H04L 5/0053 370/315 |
| 2011/0128893 | A1 | 6/2011 | Park et al. | |
| 2011/0274031 | A1 | 11/2011 | Gaal et al. | |
| 2012/0076070 | A1* | 3/2012 | Takano | H04W 72/04 370/315 |
| 2012/0147794 | A1* | 6/2012 | Chung | H04L 5/0057 370/280 |
| 2014/0362743 | A1* | 12/2014 | Park | H04B 7/14 370/279 |
| 2017/0208574 | A1* | 7/2017 | Ramakrishna | H04B 7/15528 |
| 2017/0245255 | A1 | 8/2017 | Lin et al. | |

FOREIGN PATENT DOCUMENTS

| | | |
|---|---|---|
| CN | 106304351 A | 1/2017 |
| CN | 106304366 A | 1/2017 |

* cited by examiner

RESOURCE INDICATION METHOD AND COMMUNICATIONS DEVICE

CROSS-REFERENCE TO RELATED APPLICATIONS

This application is a continuation of International Application No. PCT/CN2018/082126, filed on Apr. 8, 2018, which claims priority to Chinese Patent Application No. 201710301485.1, filed on May 2, 2017, The disclosures of the aforementioned applications are hereby incorporated by reference in their entireties.

TECHNICAL FIELD

This application relates to the communications field, and more specifically, to a resource indication method and a communications device.

BACKGROUND

A relay system includes three types of nodes: a base station, a relay, and a user. A link between the base station and the relay is a backhaul link (BH), and a link between the relay and the user is an access link (AC). In a long term evolution (LTE) system, a time domain resource of a backhaul link or an access link is a periodic time domain resource configured by higher layer signaling. A configuration change speed of the higher layer signaling is relatively low. When a transmission bottleneck occurs in either of the backhaul link and the access link, a transmission bottleneck problem cannot be resolved in time.

SUMMARY

This application provides a resource indication method and a communications device, to improve resource allocation flexibility of a link, thereby helping resolve a transmission bottleneck problem.

According to a first aspect, a resource indication method is provided. The method includes:

sending, by a first device, first indication information to a second device in an $n^{th}$ time unit, where the first indication information is used to indicate a first time domain resource of a first link or a second link in an $(n+k_0)^{th}$ time unit to an $(n+k_1)^{th}$ time unit, the first link is a link between the first device and the second device, the second link is a link between the second device and a third device, $k_0$ is an integer greater than or equal to 0 and less than or equal to $k_1$, and $k_1$ is an integer.

The first link may be a backhaul link between the first device and the second device. The second link may be a backhaul link or an access link between the second device and the third device. When a third link is user equipment, the second link is an access link. The first link and the second link are different links. In a subsequent evolved communications system, the first link and the second link may have other names.

A time domain resource of a backhaul link or an access link in the $(n+k_0)^{th}$ time unit to the $(n+k_1)^{th}$ time unit is indicated in the $n^{th}$ time unit, so that the time domain resource can be dynamically and flexibly allocated to the backhaul link or the access link, thereby helping resolve a transmission bottleneck problem of the backhaul link or the access link in time.

In some possible embodiments, the method further includes:

sending, by the first device, second indication information to the second device, where the second indication information is used to indicate a second time domain resource of the first link and/or the second link. Optionally, the first time domain resource that is of the first link or the second link and that is indicated by the first indication information is located at a location other than the second time domain resource in the $(n+k_0)^{th}$ time unit to the $(n+k_1)^{th}$ time unit.

Optionally, the first device may further indicate a value of $k_0$ and/or $k_1$ to the second device, or indicate a range of the $(n+k_0)^{th}$ time unit to the $(n+k_1)^{th}$ time unit, or indicate a location of the first time domain resource that is of the first link or the second link and that is indicated by the first indication information. Optionally, the first device may alternatively indicate, to the second device, a resource that is not indicated by the first indication information, and the second device determines, based on the resource that is not indicated by the first indication information, the value of $k_0$ and/or $k_1$, or the range of the $(n+k_0)^{th}$ time unit to the $(n+k_1)^{th}$ time unit, or the location of the first time domain resource that is of the first link or the second link and that is indicated by the first indication information.

In some possible embodiments, the time domain resources of the second link include a first-type time domain resource and a second-type time domain resource of the second link, a location of the first-type time domain resource of the second link and a location of the second-type time domain resource of the second link in time domain meet a preset relationship, the second-type time domain resource of the second link is used to transmit feedback information, and the feedback information is a feedback to information and/or a reference signal transmitted on some or all time domain resources in the first-type time domain resource of the second link.

In some possible embodiments, the first device sends third indication information to the second device, where the third indication information is used to indicate a first time domain resource set and a second time domain resource set, time domain resources in the first time domain resource set are used for uplink of the first link and downlink of the second link, and the second time domain resource set is used for downlink of the first link and uplink of the second link.

Because second devices in a same resource group do not need to switch between receiving and sending, a guard time may not be required for switching between the first link and the second link, that is, all the second devices perform sending or receiving.

In some possible embodiments, the first indication information is further used to indicate a type of the first time domain resource of the first link or the second link, the type of the first time domain resource of the first link is a time domain resource used for uplink or downlink of the first link, and the type of the first time domain resource of the second link is a time domain resource used for uplink or downlink of the second link.

In some possible embodiments, the first indication information includes one of the following information: an identifier of the first time domain resource of the first link or the second link in a plurality of groups of candidate time domain resources, information about a proportion of the first time domain resource of the first link or the second link in the $(n+k_0)^{th}$ time unit to the $(n+k_1)^{th}$ time unit, and switching locations of the first time domain resources of the first link and the second link in the $(n+k_0)^{th}$ time unit to the $(n+k_1)^{th}$ time unit.

In some possible embodiments, the first indication information is used to indicate that a time unit in the $(n+k_0)^{th}$ time unit to the $(n+k_1)^{th}$ time unit is the first time domain resource of the first link or the second link. Specifically, the first indication information may indicate the first time domain resource of the first link or the second link in a bitmap manner.

In some possible embodiments, the method further includes: receiving, by the first device, status information that is of the first link and/or the second link and that is sent by the second device, where the status information includes channel state information and/or load information.

In this way, the first device can determine, based on status information of a link, a time-frequency resource of the link. This helps improve link transmission reliability, and further helps improve resource utilization.

According to a second aspect, a resource indication method is provided. The method includes:

receiving, by a second device, first indication information sent by a first device in an $n^{th}$ time unit, where the first indication information is used to indicate a first time domain resource of a first link or a second link in an $(n+k_0)^{th}$ time unit to an $(n+k_1)^{th}$ time unit, the first link is a link between the first device and the second device, the second link is a link between the second device and a third device, $k_0$ is an integer greater than or equal to 0 and less than or equal to $k_1$, and $k_1$ is an integer.

In this way, the time domain resource can be dynamically and flexibly allocated to the backhaul link or the access link, thereby helping resolve a transmission bottleneck problem of the backhaul link or the access link in time.

In some possible embodiments, the method further includes:

receiving, by the second device, second indication information sent by the first device, where the second indication information is used to indicate a second time domain resource of the first link and/or the second link, and the first time domain resource that is of the first link or the second link and that is indicated by the first indication information is located at a location other than the second time domain resource in the $(n+k_0)^{th}$ time unit to the $(n+k_1)^{th}$ time unit.

In some possible embodiments, the time domain resources of the second link include a first-type time domain resource of the second link and a second-type time domain resource of the second link, a location of the first-type time domain resource of the second link and a location of the second-type time domain resource of the second link in time domain meet a preset relationship, the second-type time domain resource of the second link is used to transmit feedback information, and the feedback information is a feedback to information transmitted on some or all time domain resources in the first-type time domain resource of the second link.

In some possible embodiments, the first indication information is further used to indicate a type of the first time domain resource of the first link or the second link, the type of the first time domain resource of the first link is a time domain resource used for uplink or downlink of the first link, and the type of the first time domain resource of the second link is a time domain resource used for uplink or downlink of the second link.

In some possible embodiments, the first indication information includes one of the following information: an identifier of the first time domain resource of the first link or the second link in a plurality of groups of candidate time domain resources, information about a proportion of the first time domain resource of the first link or the second link in the $(n+k_0)^{th}$ time unit to the $(n+k_1)^{th}$ time unit, and switching locations of the first time domain resource of the first link and the first time domain resource of the second link in the $(n+k_0)^{th}$ time unit to the $(n+k_1)^{th}$ time unit.

In some possible embodiments, the first indication information is used to indicate that a time unit in the $(n+k_0)^{th}$ time unit to the $(n+k_1)^{th}$ time unit is the first time domain resource of the first link or the second link.

In some possible embodiments, the method further includes:

sending, by the second device, status information of the first link and/or the second link to the first device, where the status information includes channel state information and/or load information.

According to a third aspect, a communications device is provided. The communications device includes:

a processor, configured to generate first indication information, where the first indication information is used to indicate a first time domain resource of a first link or a second link in an $(n+k_0)^{th}$ time unit to an $(n+k_1)^{th}$ time unit, the first link is a link between the first device and the second device, the second link is a link between the second device and a third device, $k_0$ is an integer greater than or equal to 0 and less than or equal to $k_1$, and $k_1$ is an integer; and a transceiver, configured to send the first indication information in an $n^{th}$ time unit.

A time domain resource of a backhaul link or an access link in the $(n+k_0)^{th}$ time unit to the $(n+k_1)^{th}$ time unit is indicated in the $n^{th}$ time unit, so that the time domain resource can be dynamically and flexibly allocated to the backhaul link or the access link, thereby helping resolve a transmission bottleneck problem of the backhaul link or the access link in time.

In some possible embodiments, the processor is further configured to generate second indication information, where the second indication information is used to indicate a second time domain resource of the first link and/or the second link, and the first time domain resource that is of the first link or the second link and that is indicated by the first indication information is located at a location other than the second time domain resource in the $(n+k_0)^{th}$ time unit to the $(n+k_1)^{th}$ time unit; and the transceiver is further configured to send the second indication information.

In some possible embodiments, the time domain resources of the second link include a first-type time domain resource and a second-type time domain resource of the second link, a location of the first-type time domain resource of the second link and a location of the second-type time domain resource of the second link in time domain meet a preset relationship, the second-type time domain resource of the second link is used to transmit feedback information, and the feedback information is a feedback to information transmitted on some or all time domain resources in the first-type time domain resource of the second link.

In some possible embodiments, the transceiver is further configured to send third indication information, where the third indication information is used to indicate a first time domain resource set and a second time domain resource set, time domain resources in the first time domain resource set are used for uplink of the first link and downlink of the second link, and the second time domain resource set is used for downlink of the first link and uplink of the second link.

In some possible embodiments, the first indication information is further used to indicate a type of the first time domain resource of the first link or the second link, the type of the first time domain resource of the first link is a time domain resource used for uplink or downlink of the first link, and the type of the first time domain resource of the second link is a time domain resource used for uplink or downlink of the second link.

In some possible embodiments, the first indication information includes one of the following information: an identifier of the first time domain resource of the first link or the second link in a plurality of groups of candidate time domain resources, information about a proportion of the first time domain resource of the first link or the second link in the $(n+k_0)^{th}$ time unit to the $(n+k_1)^{th}$ time unit, and switching locations of the first time domain resources of the first link and the second link in the $(n+k_0)^{th}$ time unit to the $(n+k_1)^{th}$ time unit.

In some possible embodiments, the first indication information is used to indicate that a time unit in the $(n+k_0)^{th}$ time unit to the $(n+k_1)^{th}$ time unit is the first time domain resource of the first link or the second link.

In some possible embodiments, the transceiver is further configured to receive status information that is of the first link and/or the second link and that is sent by the second device, where the status information includes channel state information and/or load information.

According to a fourth aspect, a communications device is provided. The communications device includes:

a transceiver, configured to receive first indication information, where the first indication information is used to indicate a first time domain resource of a first link or a second link in an $(n+k_0)^{th}$ time unit to an $(n+k_1)^{th}$ time unit, the first link is a link between the first device and the second device, the second link is a link between the second device and a third device, $k_0$ is an integer greater than or equal to 0 and less than or equal to $k_1$, and $k_1$ is an integer.

In this way, the time domain resource can be dynamically and flexibly allocated to the backhaul link or the access link, thereby helping resolve a transmission bottleneck problem of the backhaul link or the access link in time.

In some possible embodiments, the transceiver is further configured to receive second indication information, where the second indication information is used to indicate a second time domain resource of the first link and/or the second link, and the first time domain resource that is of the first link or the second link and that is indicated by the first indication information is located at a location other than the second time domain resource in the $(n+k_0)^{th}$ time unit to the $(n+k_1)^{th}$ time unit.

In some possible embodiments, the time domain resources of the second link include a first-type time domain resource of the second link and a second-type time domain resource of the second link, a location of the first-type time domain resource of the second link and a location of the second-type time domain resource of the second link in time domain meet a preset relationship, the second-type time domain resource of the second link is used to transmit feedback information, and the feedback information is a feedback to information transmitted on some or all time domain resources in the first-type time domain resource of the second link.

In some possible embodiments, the first indication information is further used to indicate a type of the first time domain resource of the first link or the second link, the type of the first time domain resource of the first link is a time domain resource used for uplink or downlink of the first link, and the type of the first time domain resource of the second link is a time domain resource used for uplink or downlink of the second link.

In some possible embodiments, the first indication information includes one of the following information: an identifier of the first time domain resource of the first link or the second link in a plurality of groups of candidate time domain resources, information about a proportion of the first time domain resource of the first link or the second link in the $(n+k_0)^{th}$ time unit to the $(n+k_1)^{th}$ time unit, and switching locations of the first time domain resource of the first link and the first time domain resource of the second link in the $(n+k_0)^{th}$ time unit to the $(n+k_1)^{th}$ time unit.

In some possible embodiments, the first indication information is used to indicate that a time unit in the $(n+k_0)^{th}$ time unit to the $(n+k_1)^{th}$ time unit is the first time domain resource of the first link or the second link.

In some possible embodiments, the transceiver is further configured to send status information of the first link and/or the second link, where the status information includes channel state information and/or load information.

In some possible designs, a network device provided in this application may include a corresponding module configured to perform behavior of the network device in the foregoing method designs. The module may be software and/or hardware.

In some possible designs, a terminal provided in this application may include a corresponding module configured to perform behavior of the terminal in the foregoing method designs. The module may be software and/or hardware.

Another aspect of this application provides a computer-readable storage medium. The computer-readable storage medium stores an instruction, and when run on a computer, the instruction enables the computer to perform the methods according to the foregoing aspects.

Another aspect of this application provides a computer program product including an instruction; and when the computer program product is run on a computer, the computer is enabled to perform the methods according to the foregoing aspects.

DESCRIPTION OF EMBODIMENTS

The following describes embodiments of the technical solutions of this application with reference to the accompanying drawings.

Figure 1:
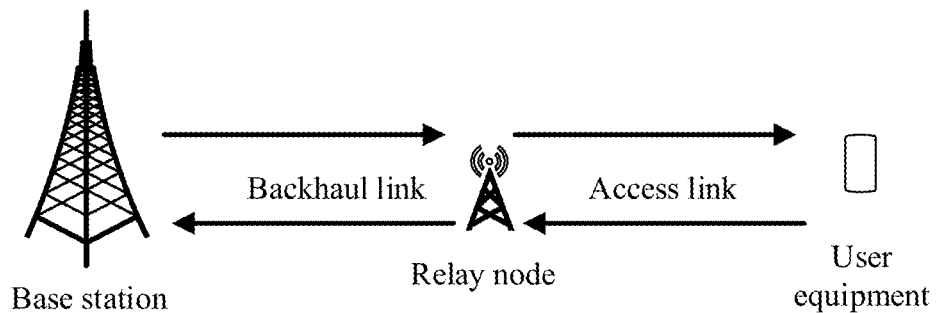
FIG. 1 is a schematic structural diagram of a system according to an embodiment of the present invention.

FIG. 1 is a schematic diagram of a possible system network in this application. As shown in FIG. 1, a link between a network device (for example, a base station) and user equipment includes at least one relay node. For clarity, only one relay node is shown in the figure. For ease of understanding, the following describes some nouns used in this application.

In this application, nouns "network" and "system" are usually interchangeably used, but a person skilled in the art can understand meanings of the nouns. The user equipment (UE) is a terminal device having a communication function, may also be referred to as a terminal, and may include a handheld device, a vehicle-mounted device, a wearable device, or a computing device that has a wireless communication function, another processing device connected to a wireless modem, or the like. The user equipment may have different names in different networks, for example, a terminal, a mobile station, a subscriber unit, a station, a cellular phone, a personal digital assistant, a wireless modem, a wireless communications device, a handheld device, a laptop computer, a cordless phone, and a wireless local loop station. For ease of description, in this application, these devices are briefly referred to as user equipments, UEs, or terminals. The network device may be a base station (BS), a radio access device in a cloud network, or a device having a wireless receiving/sending function such as a relay station. The base station may also be referred to as a base station device, and is a device deployed in a radio access network to provide a wireless communication function. The base station may have different names in different radio access systems. For example, the base station in a universal mobile telecommunications system (UMTS) network is referred to as a NodeB, the base station in an LTE network is referred to as an evolved NodeB (evolved NodeB, eNB, or eNodeB), and the base station in a future fifth generation cellular network (5G) system may be referred to as a transmission reception point (TRP), a network node, or a g-NodeB (gNB).

It should be understood that a time unit may be a symbol, a mini-slot, a slot, a subframe, a frame, a symbol set, a mini-slot set, a slot set, a subframe set, a frame set, or the like. This is not limited in the embodiments of the present invention. When there are a plurality of types of time units in a system, a first device may further indicate the types of time units to a second device, for example, indicate that a time unit is a symbol, a subframe, a slot, or the like. The types of time units may alternatively be preset.

In the specification, claims, and accompanying drawings of this application, the terms "first", "second", and the like are intended to distinguish different objects but do not indicate a particular order. The term "and/or" is merely an association relationship for describing associated objects, and indicates that three relationships may exist. For example, A and/or B may represent the following three cases: Only A exists, both A and B exist, and only B exists. In addition, the character "/" in this specification generally indicates an "or" relationship between the associated objects.

In some systems, a time domain resource of a backhaul link or an access link is a statically configured periodic time domain resource, and consequently, resource allocation of the backhaul link or the access link is not sufficiently flexible. In this case, when a transmission bottleneck occurs in either of the backhaul link and the access link, a resource cannot be flexibly allocated to the link, and consequently, a transmission bottleneck problem cannot be resolved in time. The embodiments of the present invention provide a communication method. A time domain resource of the backhaul link or the access link in an $(n+k_0)^{th}$ time unit to an $(n+k_1)^{th}$ time unit is indicated in an $n^{th}$ time unit, so that the time domain resource can be dynamically and flexibly allocated to the backhaul link or the access link, thereby helping resolve a transmission bottleneck problem of the backhaul link or the access link in time.

It should be noted that in the embodiments of the present invention, a relay system shown in FIG. 1 may include one relay node, or may include a plurality of relay nodes. When the relay system includes a plurality of relay nodes, a link between two neighboring relay nodes is also referred to as a backhaul link.

Figure 2:
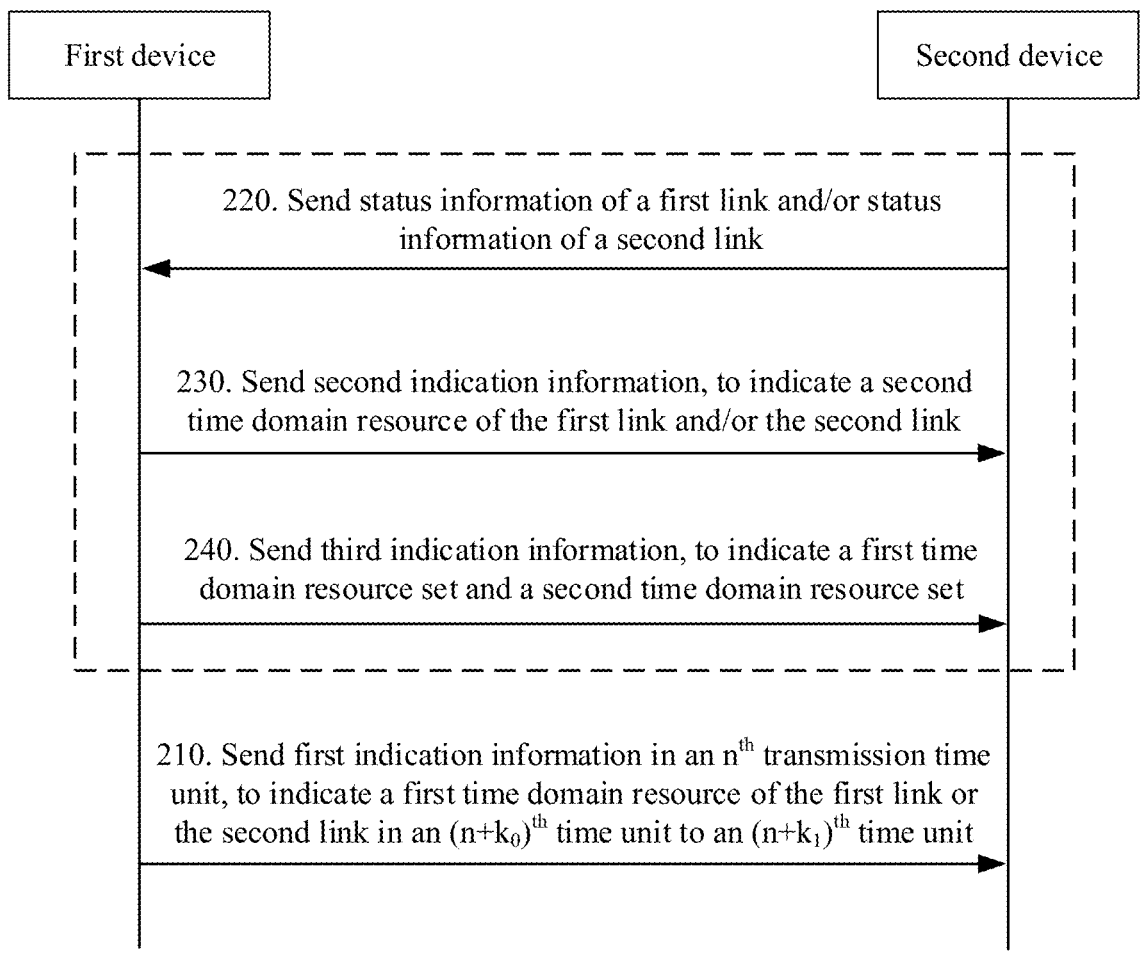
FIG. 2 is a schematic flowchart of a resource indication method according to an embodiment of the present invention.

FIG. 2 is a schematic flowchart of a communication method 200 according to an embodiment of the present invention. As shown in FIG. 2, the method 200 includes the following content.

210. A first device sends first indication information to a second device in an $n^{th}$ time unit, where the first indication information is used to indicate a first time domain resource of a first link or a second link in an $(n+k_0)^{th}$ time unit to an $(n+k_1)^{th}$ time unit, the first link is a link between the first device and the second device, the second link is a link between the second device and a third device, $k_0$ is an integer greater than or equal to 0 and less than or equal to $k_1$, and $k_1$ is an integer.

Correspondingly, the second device receives the first indication information, and communicates with the first device on the first time domain resource of the first link or communicates with the third device on the first time domain resource of the second link according to the first indication information.

In some embodiments, if the first indication information indicates the time domain resource of the first link in the $(n+k_0)^{th}$ time unit to the $(n+k_1)^{th}$ time unit, a resource other than the time domain resource of the first link in the $(n+k_0)^{th}$ time unit to the $(n+k_1)^{th}$ time unit is the time domain resource of the second link. Alternatively, if the first indication information indicates the time domain resource of the second link in the $(n+k_0)^{th}$ time unit to the $(n+k_1)^{th}$ time unit, a resource other than the time domain resource of the second link in the $(n+k_0)^{th}$ time unit to the $(n+k_1)^{th}$ time unit is the time domain resource of the first link. Therefore, the second device may determine the time domain resource of the first link and the time domain resource of the second link according to the first indication information.

The first device may be a network device (for example, a base station), or may be a relay node in a link. The second device may be a relay node in a link, or may be user equipment. It should be noted that the relay node in the link may alternatively be a network device (such as a base station), UE, or another device that implements a relay function.

The first link may be a backhaul link between the first device and the second device. The second link may be a backhaul link or an access link between the second device and the third device. When a third link is user equipment, the second link is an access link.

In this embodiment of the present invention, the time domain resource of the backhaul link or the access link in the $(n+k_0)^{th}$ time unit to the $(n+k_1)^{th}$ time unit is indicated in the $n^{th}$ time unit, so that the time domain resource can be dynamically and flexibly allocated to the backhaul link or the access link, thereby helping resolve a transmission bottleneck problem of the backhaul link or the access link in time.

It should be noted that values of $k_0$ and $k_1$ may be predefined, may be configured by the base station, or may be configured by using higher layer signaling. In some embodiments, $k_1$ is greater than or equal to $2*k_0$. In some embodiments, $k_0$ is greater than or equal to a maximum scheduling time of the first link. Optionally, the second device may report the value of $k_0$ and/or $k_1$, a request for a range of the $(n+k_0)^{th}$ time unit to the $(n+k_1)^{th}$ time unit, or a request for a location of the first time domain resource of the first link or the second link, and the second device reports a scheduling processing capability of the second device by reporting the foregoing information.

It should be further noted that the first device may further allocate a frequency domain resource and/or a code domain resource to the second device. For details, refer to the prior art. This is not limited in this embodiment of the present invention.

Optionally, the first indication information may be carried in higher layer signaling or downlink control information (DCI), or may be carried in a combination of higher layer signaling and DCI. For example, the higher layer signaling may configure a plurality of groups of candidate time domain resources, and the DCI indicates one group of candidate time domain resources in the plurality of groups of candidate time domain resources. Alternatively, one piece of higher layer signaling is used to configure a plurality of candidate time domain resource sets, another piece of higher layer signaling is used to configure one of the candidate time domain resource sets, and the DCI is used to indicate one group of candidate time domain resources in the candidate time domain resource set. Higher layer signaling may include any one of the following: radio resource control (RRC) signaling, a system message, a broadcast message, and a media access control control element (MAC CE). Optionally, the DCI may be scrambled by using a radio network temporary identifier (RNTI) of the second device. In this way, the second device can correctly receive the DCI based on the RNTI.

The RNTI is configured by the base station for the second device. Alternatively, the RNTI is configured by the base station for a second device group, and second devices in the second device group have a same RNTI. Alternatively, user equipments having relay functions have a same RNTI, and the RNTI is configured by the base station or preset. For example, the RNTI is configured by using a broadcast message/system message, or is predefined in a communication protocol.

The DCI may be carried on a downlink control channel specific to a relay node, a downlink control channel for preconfiguration, or a user-specific downlink control channel. Optionally, the DCI or the RNTI is dedicated to a second device having a relay function, and is used only when the second device has the relay function. The first indication information may be carried in a newly added domain or field in the DCI in an existing format, or carried in the DCI in a new format.

Figure 3:
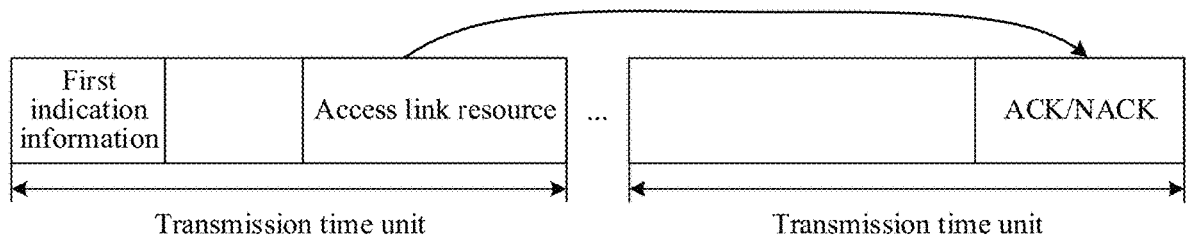
FIG. 3 is a schematic diagram of an access link resource according to an embodiment of the present invention.

Optionally, when k0=k1=0, the first indication information may be used to indicate the time domain resource of the access link in the $n^{th}$ time unit. In other words, the first indication information may be further used to indicate a time domain resource of an access link in the time unit. For example, the time domain resource that is of the access link and that is indicated by the first indication information may be a time domain resource used for downlink of the access link. Correspondingly, a location of a time domain resource used for uplink feedback of the access link and a location of a time domain resource used for downlink of the access link in time domain may satisfy a predefined or configured relationship. In this case, after receiving the first indication information, the UE may determine the time domain resource used for uplink feedback, for example, a time domain resource used for a negative acknowledgment (NACK)/acknowledgment (ACK). Optionally, as shown in FIG. 3, the time domain resource used for uplink feedback of the access link and the time domain resource used for downlink of the access link may be located in different time units (for example, slots).

Optionally, the time domain resources of the second link include a first-type time domain resource of the second link and a second-type time domain resource of the second link. A location of the first-type time domain resource of the second link and a location of the second-type time domain resource of the second link in time domain meet a preset relationship. For example, the second-type time domain resource of the second link and the first-type time domain resource of the second link are spaced by a preset quantity of time units. The preset relationship that the location of the first-type time domain resource of the second link and the location of the second-type time domain resource of the second link in time domain meet may be predefined or configured by using higher layer signaling. The second-type time domain resource of the second link and the first-type time domain resource of the second link may be different time unit types. For example, the first-type time domain resource of the second link is one or more slots, and the second-type time domain resource of the second link is one or more symbols.

The second-type time domain resource of the second link is used to transmit feedback information, and the feedback information is a feedback to information transmitted on some or all time domain resources in the first-type time domain resource of the second link. For example, the first-type time domain resource of the second link is used for downlink transmission of the access link, and the second-type time domain resource of the second link is used for uplink feedback of the access link, for example, used to transmit an NACK/ACK.

Optionally, the first indication information includes indication information of the first-type time domain resource of the second link and indication information of the second-type time domain resource of the second link. Alternatively, the first indication information includes the indication information of the first-type time domain resource of the second link, and the UE may determine the second-type time domain resource of the second link based on the preset relationship that the location of the first-type time domain resource of the second link and the location of the second-type time domain resource of the second link in time domain meet.

Optionally, a length of the second-type time domain resource of the second link in time domain is predefined or configured by using higher layer signaling.

Optionally, time domain resources of the first link includes a first-type time domain resource of the first link and a second-type time domain resource of the first link. A location of the first-type time domain resource of the first link and a location of the second-type time domain resource of the first link in time domain meet a preset relationship.

For example, the second-type time domain resource of the first link and the first-type time domain resource of the first link are spaced by a preset quantity of time units. The preset relationship that the location of the first-type time domain resource of the first link and the location of the second-type time domain resource of the first link in time domain meet may be predefined or configured by using higher layer signaling. The second-type time domain resource of the first link and the first-type time domain resource of the first link may be different time unit types. For example, the first-type time domain resource of the first link is one or more slots, and the second-type time domain resource of the first link is one or more symbols.

The second-type time domain resource of the first link is used to transmit feedback information, and the feedback information is a feedback to information transmitted on some or all time domain resources in the first-type time domain resource of the first link. For example, the first-type time domain resource of the first link is used for downlink transmission of the backhaul link, and the second-type time domain resource of the first link is used for uplink feedback of the backhaul link, for example, used to transmit an NACK/ACK, a channel quality indicator (CQI) information feedback, or a beam scanning information feedback.

Optionally, the first indication information may further include indication information of the first-type time domain resource of the first link and indication information of the second-type time domain resource of the first link. Alternatively, the first indication information includes the indication information of the first-type time domain resource of the first link, and the UE may determine the second-type time domain resource of the first link based on the preset relationship that the location of the first-type time domain resource of the first link and the location of the second-type time domain resource of the first link in time domain meet.

Optionally, a length of the second-type time domain resource of the first link in time domain is predefined or configured by using higher layer signaling. Optionally, the first indication information is further used to indicate a type of the first time domain resource of the first link or the second link, the type of the first time domain resource of the first link is a time domain resource used for uplink or downlink of the first link, and the type of the resource of the second link is a time domain resource used for uplink or downlink of the second link. In other words, in this embodiment of the present invention, when allocating the time domain resource to the second device, the first device may indicate whether the time domain resource allocated to the second device is used for uplink transmission or downlink transmission of a link.

In four transmission scenarios: uplink of the first link, downlink of the first link, uplink of the second link, and downlink of the second link, sending is performed by the second device in both the uplink of the first link and the downlink of the second link, and receiving is performed by the second device in both the downlink of the first link and the uplink of the second link.

Therefore, the time domain resources may be divided into two groups, which are respectively used for sending and receiving by the second device:

Resource group 1: time domain resources that may be used for both the uplink of the first link and the downlink of the second link.

Resource group 2: time domain resources that may be used for both the downlink of the first link and the uplink of the second link.

Alternatively, the time domain resources may be divided into two types, which are respectively used for sending and receiving by the second device:

Type 1: time domain resources that may be used for both the uplink of the first link and the downlink of the second link;

Type 2: time domain resources that may be used for both the downlink of the first link and the uplink of the second link.

Correspondingly, the first indication information may further include the identifiers of the resource groups or the types of the time domain resources. In this way, the second device may determine, based on the identifiers of the resource groups or the types of the time domain resources, a transmission scenario in which the time domain resource indicated by the first indication information is used.

Because second devices in a same resource group or second devices of a same resource type do not need to switch between receiving and sending, a guard time may not be required for switching between the first link and the second link in the same resource group or of the same resource type, that is, all the second devices perform sending or receiving. Specifically, a guard time is not required for switching between the uplink of the first link and the downlink of the second link, and a guard time is not required for switching between the downlink of the first link and the uplink of the second link.

Figure 4:
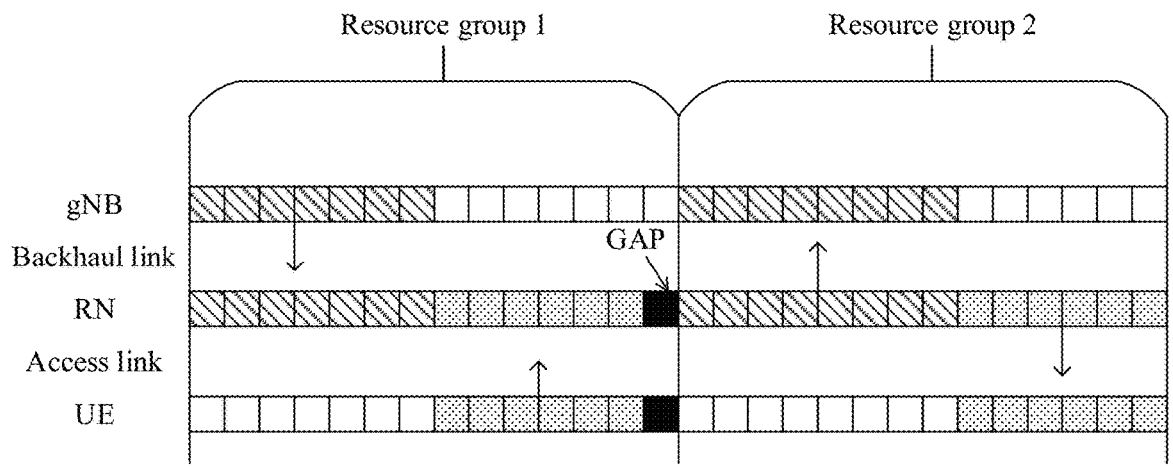
FIG. 4 is a schematic diagram of resource groups according to an embodiment of the present invention.
Figure 5:
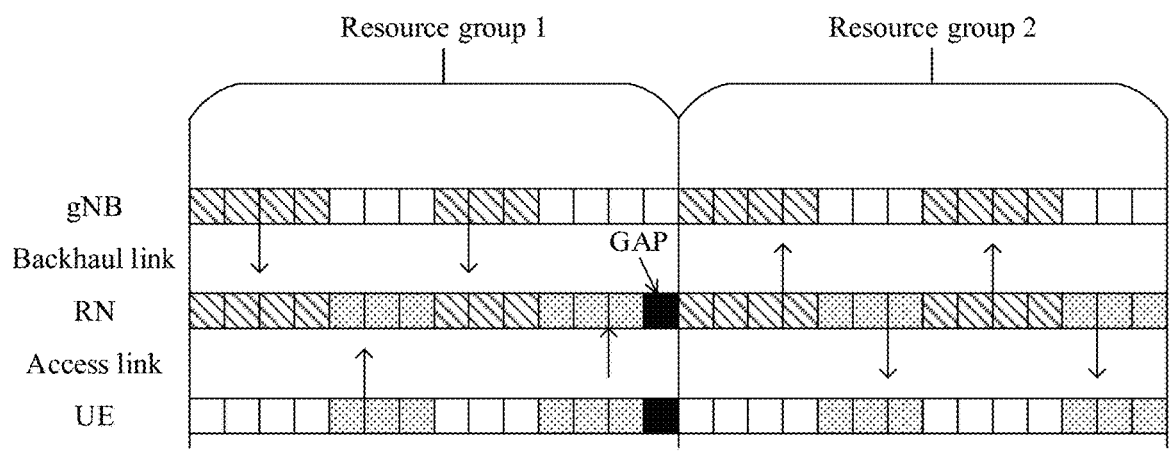
FIG. 5 is another schematic diagram of resource groups according to an embodiment of the present invention.

It should be noted that a specific division form of resources in a resource group is not limited in this embodiment of the present invention. As shown in FIG. 4, time domain resources used for uplink transmission or downlink transmission of a same link in a resource group may be continuous. Alternatively, as shown in FIG. 5, time domain resources used for uplink transmission or downlink transmission of a same link in a resource group may be discontinuous, and a GAP (e.g., a Guard Period) in the figure may represent a guard period.

Optionally, the first indication information includes an identifier of the first time domain resource of the first link or the second link in a plurality of groups of candidate time domain resources. For example, a plurality of groups of candidate time domain resources may be preconfigured for the second device. In this way, the second device can determine the first time domain resource of the first link or the second link based on an identifier of the first time domain resource of the first link or the second link in the plurality of groups of candidate time domain resources.

It should be understood that values of $k_0$ and $k_1$ may be predefined or may be configured by the base station. In this way, the second device may learn that the first indication information indicates a time domain resource in the $(n+k_0)^{th}$ time unit to the $(n+k_1)^{th}$ time unit. Alternatively, a sequence relationship between the time domain resource of the first link and the time domain resource of the second link in time domain may be predefined or may be configured by the base station. For example, the time domain resource of the first link is earlier than the time domain resource of the second link, or the time domain resource of the second link is earlier than the time domain resource of the first link.

Optionally, the first indication information may include one of the following information: information about a proportion of the first time domain resource of the first link or the second link in the $(n+k_0)^{th}$ time unit to the $(n+k_1)^{th}$ time unit, and switching locations of the first time domain resources of the first link and the second link in the $(n+k_0)^{th}$ time unit to the $(n+k_1)^{th}$ time unit. In this way, the second device can determine the time domain resource of the first link or the time domain resource of the second link according to the first indication information.

A guard period may be set between the first time domain resource of the first link and the first time domain resource of the second link in the $(n+k_0)^{th}$ time unit to the $(n+k_1)^{th}$ time unit, and a length of the guard period may be configured by using higher layer signaling or predefined. For example, the length of the guard period may be a reference subcarrier spacing, twice a reference subcarrier spacing, four times a reference subcarrier spacing, or the like, and the reference subcarrier spacing is a subcarrier spacing used for transmission before switching or a subcarrier spacing configured by the base station. For example, when the first time domain resource of the first link is switched to the first time domain resource of the second link, the guard period is located in at least one last symbol in the last time unit in the first time domain resource of the first link. Alternatively, when the first time domain resource of the second link is switched to the first time domain resource of the first link, the guard period is located in at least one last symbol in the last time unit in the first time domain resource of the second link.

Optionally, the first indication information is used to indicate that a time unit in the $(n+k_0)^{th}$ time unit to the $(n+k_1)^{th}$ time unit is the first time domain resource of the first link or the second link. Specifically, the first indication information may indicate the first time domain resource of the first link or the second link in a bitmap manner. For example, assuming that the $(n+k_0)^{th}$ time unit to the $(n+k_1)^{th}$ time unit are ten time units, and in a bitmap, and 1 is used to indicate that a corresponding time unit is the first time domain resource of the first link, a bitmap 0010100101 indicates that the third, the fifth, the eighth, and the tenth time units in the ten time units are first time domain resources of the first link.

Optionally, before 210, the method 200 may further include: 220. The second device sends status information of the first link and/or status information of the second link to the first device. Correspondingly, the first device receives the status information of the first link and/or the second link.

The status information may include channel state information and/or load information. The first device may determine, based on status information of a link, a time-frequency resource of the link. This helps improve link transmission reliability, and further helps improve resource utilization. For example, the first device may determine the time-frequency resource of the link based on the status information of the link and according to a principle of optimizing a cell throughput, or the like.

Optionally, before 210, the method 200 may further include:

230. The first device sends second indication information to the second device, where the second indication information indicates a second time domain resource of the first link and/or the second link, and the first time domain resource that is of the first link or the second link and that is indicated by the first indication information is located at a location other than the second time domain resource in the $(n+k_0)^{th}$ time unit to the $(n+k_1)^{th}$ time unit. Correspondingly, the second device receives the second indication information.

Optionally, the second indication information may further indicate a period of the specified time domain resource. The second indication information may be carried in higher layer signaling or DCI.

In some embodiments, the second indication information is carried in higher layer signaling, and the first indication information is carried in DCI. In this way, one part of the time domain resource may be semi-statically configured for the first link and/or the second link by using the higher layer signaling, and the other part of the time domain resource is dynamically configured for the first link or the second link by using dynamic signaling. Such a configuration is more flexible, and helps resolve a transmission bottleneck problem of the backhaul link or the access link in time.

In some embodiments, a resource indicated by second signaling may be used to transmit some periodic reference signals or channels.

In some embodiments, some resources fixedly used for the second link or the first link may alternatively be predefined. In this case, the first device does not need to send the second indication information to the second device. For example, a time unit in which a synchronization signal of the first link is located is fixedly used for the first link.

It should be noted that if the second indication information indicates the second time domain resource of the first link, the second time domain resource cannot be used for transmission of the first link. If the second indication information indicates the second time domain resource of the second link, the second time domain resource cannot be used for transmission of the first link.

It should be further noted that the first device may further indicate, to the second device, a time domain resource that cannot be used for the first link and/or the second link.

Optionally, before 210, the method 200 may further include:

240: The first device sends third indication information to the second device, where the third indication information is used to indicate a first time domain resource set and a second time domain resource set, time domain resources in the first time domain resource set are used for uplink of the first link and downlink of the second link, and the second time domain resource set is used for downlink of the first link and uplink of the second link. Correspondingly, the second device receives the third indication information. It should be noted that, herein, for division of the first time domain resource set and the second time domain resource set, refer to division of the resource group 1 and the resource group 2 or division of the type 1 and the type of the time domain resource above. Therefore, second devices in a same time domain resource set do not need to switch between receiving and sending.

The third indication information may be carried in higher layer signaling and/or DCI.

The second device may determine, according to a third indication, whether the first time domain resource that is of the first link or the second link and that is indicated by the first indication information is used for uplink transmission of the first link or the second link or is used for downlink transmission of the first link or the second link.

In other words, in this embodiment of the present invention, two time domain resource sets are preconfigured for the second device, so that the second device can determine whether the allocated time domain resource is used for uplink transmission or downlink transmission of a link, and the second device does not need to stay for a guard time during switching between the first link and the second link.

It should be noted that a downlink direction in this embodiment of the present invention is a transmission direction of DCI. For example, if the first device sends DCI to the second device, transmission from the first device to the second device is downlink transmission, and transmission from the second device to the first device is uplink transmission.

Optionally, before 210, the method 200 may further include the following step: 250. The second device sends a first resource request message to the first device, where the first resource request message is used to request a time-frequency resource of the first link or the second link. Correspondingly, the first device receives the first resource request message. In 210, the first device may send the first indication information to the second device based on the received first resource request message.

It should be understood that, in the method 200 shown in FIGS. 2, 220, 230, 240, and 250 are all optional processes. In this embodiment of the present invention, any process in 220 to 250 may not be performed, or some or all of the processes may be performed.

Figure 6:
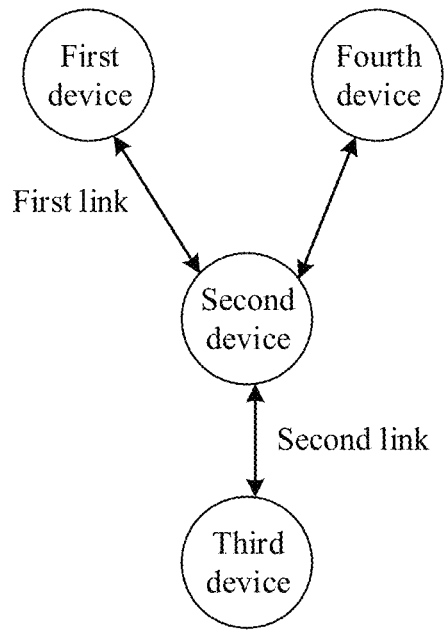
FIG. 6 is a schematic structural diagram of another system according to an embodiment of the present invention.

In some embodiments, as shown in FIG. 6, the second device further communicates with a fourth device, and the fourth device may also allocate a time domain resource to the second link. The second device may notify the first device of the time domain resource allocated by the fourth device to the second link, and the first device may allocate the time domain resource to the second link based on the time-frequency resource allocated by the fourth device. This helps avoid a case in which because the time domain resources separately allocated by the first device and the fourth device to the second link are different, the second device cannot determine which time domain resources are used for transmission of the second link. Specifically, the first resource request message may be further used to indicate the time domain resource allocated by the fourth device to the second link. Alternatively, the first resource request message is used to indicate a time domain resource required by the second link. The time domain resource required by the second link may be determined by the second device based on the time-frequency resource allocated by the fourth device to the second link.

It should be noted that the first indication information, the second indication information, and the third indication information in this embodiment may be separately sent, or may be simultaneously sent. For example, the first indication information, the second indication information, and the third indication information may be carried in different signaling or configuration information, or may be carried in different fields of same signaling or configuration information.

Figure 7:
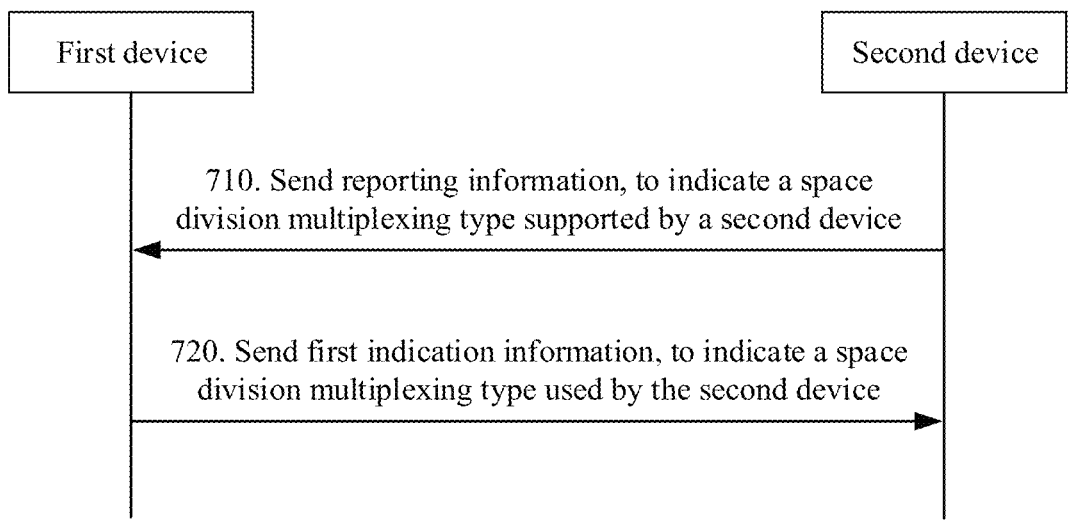
FIG. 7 is a schematic flowchart of a resource indication method according to another embodiment of the present invention.

FIG. 7 is a schematic flowchart of a communication method 700 according to another embodiment of the present invention. As shown in FIG. 7, the method 700 may include the following content.

710. A second device sends reporting information to a first device, where the reporting information is used to indicate a space division multiplexing (SDM) type or a frequency division multiplexing (FDM) type supported by the second device. Correspondingly, the first device receives the reporting information.

The SDM type supported by the second device includes at least one of or a combination of at least two of the following: uplink SDM of a first link and downlink SDM of a second link, downlink SDM of the first link and uplink SDM of the second link, uplink SDM of the first link and uplink SDM of the second link, and downlink SDM of the first link and downlink SDM of the second link, and SDM not supported, as shown in Table 1 below.

The FDM type supported by the second device includes at least one of or a combination of at least two of the following: uplink FDM of the first link and downlink FDM of the second link, downlink FDM of the first link and uplink FDM of the second link, uplink FDM of the first link and uplink FDM of the second link, and downlink FDM of the first link and downlink FDM of the second link, and FDM not supported, as shown in Table 1 below.

TABLE 1

| SDM/FDM type supported by a second device | First link | Second link |
|---|---|---|
| 1 | DL | DL |
| 2 | UL | UL |
| 3 | DL | UL |
| 4 | UL | DL |
| 5 | SDM/FDM not supported | |

The first link is a link between the first device and the second device, and the second link is a link between the second device and the third device.

It should be noted that a downlink direction in this embodiment of the present invention is a transmission direction of DCI. For example, if the first device sends DCI to the second device, transmission from the first device to the second device is downlink transmission, and transmission from the second device to the first device is uplink transmission.

In this embodiment of the present invention, space division multiplexing means that a same time-frequency resource and a same or non-orthogonal code domain resource are used and are transmitted in different spatial directions, or different receive precoders and/or transmit precoders are used for transmission, or different receive beams and/or transmit beams are used for transmission.

In this embodiment of the present invention, frequency division multiplexing means that a same time domain resource and a same or non-orthogonal code domain resource are used, and are transmitted on different frequency domain resources.

The first device may allocate, based on the SDM or FDM types supported by the second device, a proper SDM or FDM manner to the second device, and may further allocate a link resource more properly.

For example, the first device is a base station, and the second device is a relay node. If the relay node does not support space division multiplexing, the base station needs to allocate resources of a backhaul link and an access link in a time division and/or frequency division manner. If the relay node supports space division multiplexing, the base station may allocate most resources for space division transmission of the first link and the second link. For example, if the relay node supports only space division multiplexing of simultaneous receiving or simultaneous sending, that is, supports only the SDM types 1 and 2, the base station may allocate resources for space division multiplexing transmission of the types 1 and 2 of the first link and the second link. If the relay node supports space division multiplexing manners of the types 1 to 4, the base station may allocate resources for space division multiplexing transmission of the types 1 to 4 of the first link and the second link.

Therefore, in this embodiment of the present invention, the second device reports, to the first device, an SDM or FDM capability supported by the second device, for example, an SDM or FDM type, helping the first device more properly allocate a resource to a link.

Optionally, the method 700 may further include the following step: 720. The first device sends first indication information to the second device, where the first indication information is used to indicate an SDM or FDM type used by the second device. Correspondingly, after receiving the first indication information, the second device performs space division multiplexing transmission based on a space division multiplexing type indicated by the first indication information, or performs frequency division multiplexing transmission based on a frequency division multiplexing type indicated by the first indication information.

For example, the first device may determine, based on a feature of information transmitted on the first link and the second link, a space division multiplexing type used by the second device. For example, if information, such as a PDCCH, that has a relatively high reliability requirement is transmitted on the first link, the first device may instruct the second device to enable space division multiplexing for only uplink transmission. This helps improve reliability of link transmission and reduce interference between links.

The first indication information may be carried in higher layer signaling and/or DCI.

Optionally, the method 700 may further include: sending, by the first device, second indication information to the second device, where the second indication information is used to indicate one of the following information: a resource that can be used for space division multiplexing between the first link and the second link, a resource that can be used for frequency division multiplexing between the first link and the second link, and a resource that cannot be used for space division multiplexing and/or frequency division multiplexing between the first link and the second link. Correspondingly, the second device receives the second indication information. A resource that can be used for space division multiplexing or cannot be used for space division multiplexing is indicated to the second device. This helps reduce interference between links.

The second indication information may be carried in higher layer signaling and/or DCI.

Optionally, the method 700 may further include: sending, by the first device, third indication information to the second device, where the third indication information is used to indicate at least one of the following resource sets: a resource set that cannot be used for the first link or the second link, a candidate resource set of a reference signal, a control channel, and/or a shared channel of the second link, and a candidate resource set of a reference signal, a control channel, and/or a shared channel of the first link. Correspondingly, the second device receives the third indication information. The second device may determine the at least one resource set according to the third indication information. The third indication information may be carried in higher layer signaling and/or DCI.

Alternatively, there is a correspondence between the at least one resource set and a link type, and the second device may further determine the at least one resource set based on the link type.

The second device performs transmission based on the at least one resource set. This helps avoid interference between a control channel of one link and a shared channel or a reference signal of another link.

It should be noted that, when the first link and the second link perform space division multiplexing or frequency division multiplexing transmission, a resource of a pilot or a control channel transmitted on one link is orthogonal to a resource of another link. In this way, interference caused by the another link to the control channel or the pilot that is being transmitted on the current link can be avoided.

Optionally, resources corresponding to different link types may be predefined. In this way, the second device can determine a resource of a link based on a link type. The link type herein refers to either the access link or the backhaul link.

When the reporting information is used to indicate the SDM type supported by the second device, the resource in this embodiment of the present invention is a time domain resource, a frequency domain resource, and/or a code domain resource. When the reporting information is used to indicate the FDM type supported by the second device, the resource in this embodiment of the present invention is a time domain resource and/or a code domain resource.

It should be noted that the first indication information, the second indication information, and the third indication information in the foregoing embodiment may be separately sent, or may be simultaneously sent. For example, the first indication information, the second indication information, and the third indication information may be carried in different signaling or configuration information, or may be carried in different fields of same signaling or configuration information.

Figure 8:
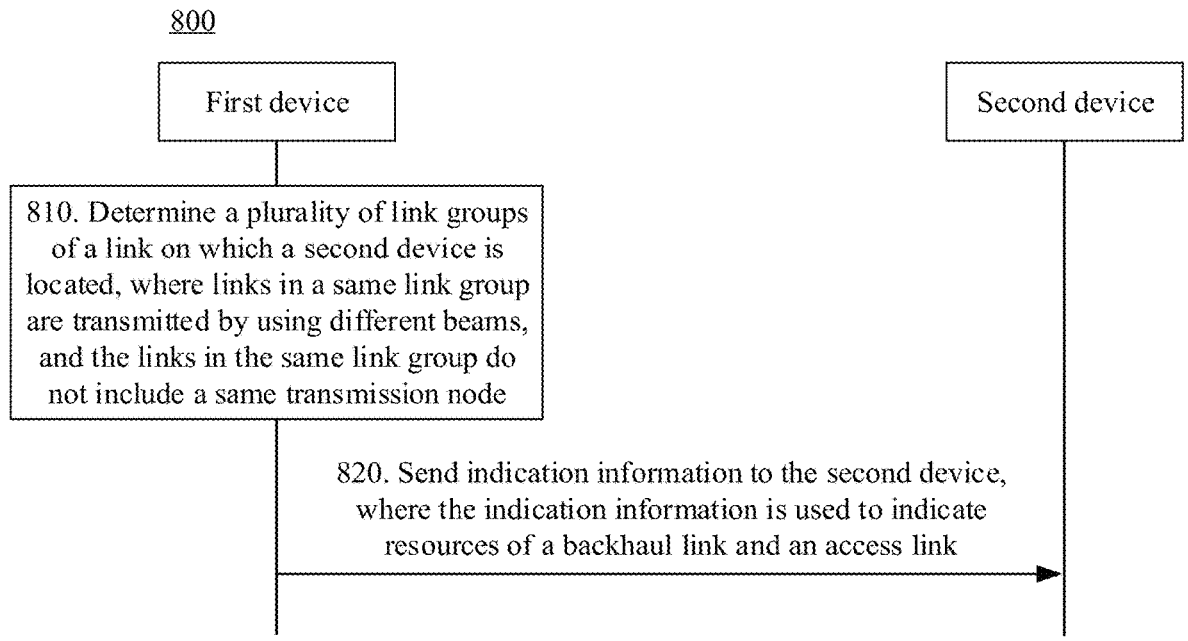
FIG. 8 is a schematic flowchart of a resource indication method according to another embodiment of the present invention.

FIG. 8 is a schematic flowchart of a communication method 800 according to another embodiment of the present invention. As shown in FIG. 8, the method 800 may include the following content.

810. A first device determines a plurality of link groups of a link on which a second device is located, and determines resources of a backhaul link and an access link based on the plurality of link groups, where links in a same link group are transmitted by using different beams, and the links in the same link group do not include a same transmission node.

Figure 9:
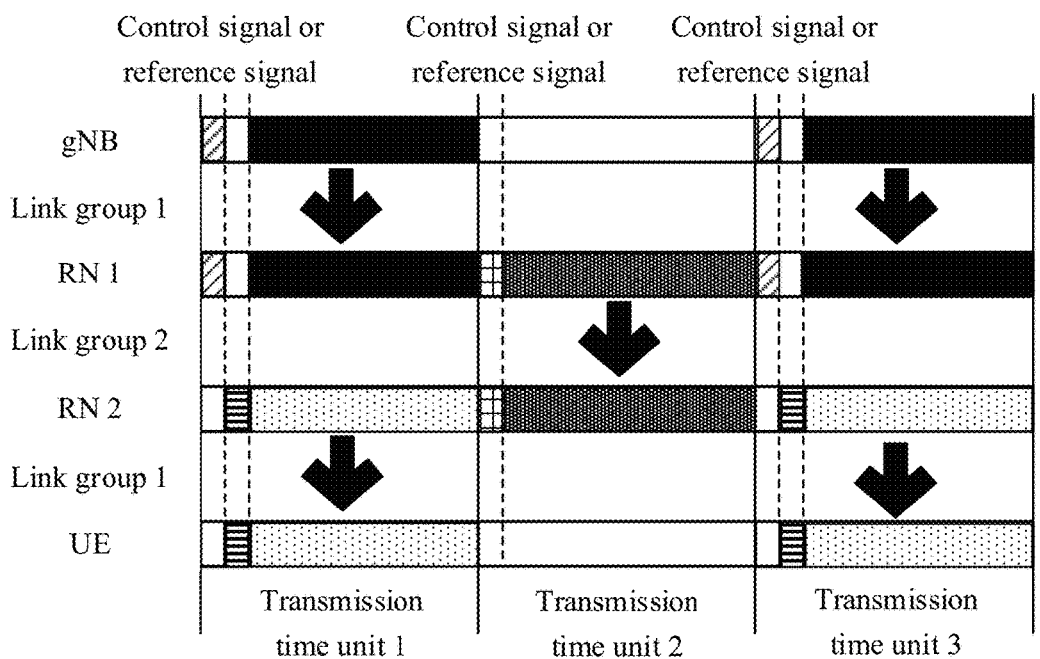
FIG. 9 is a schematic diagram of link groups according to another embodiment of the present invention.
Figure 10:
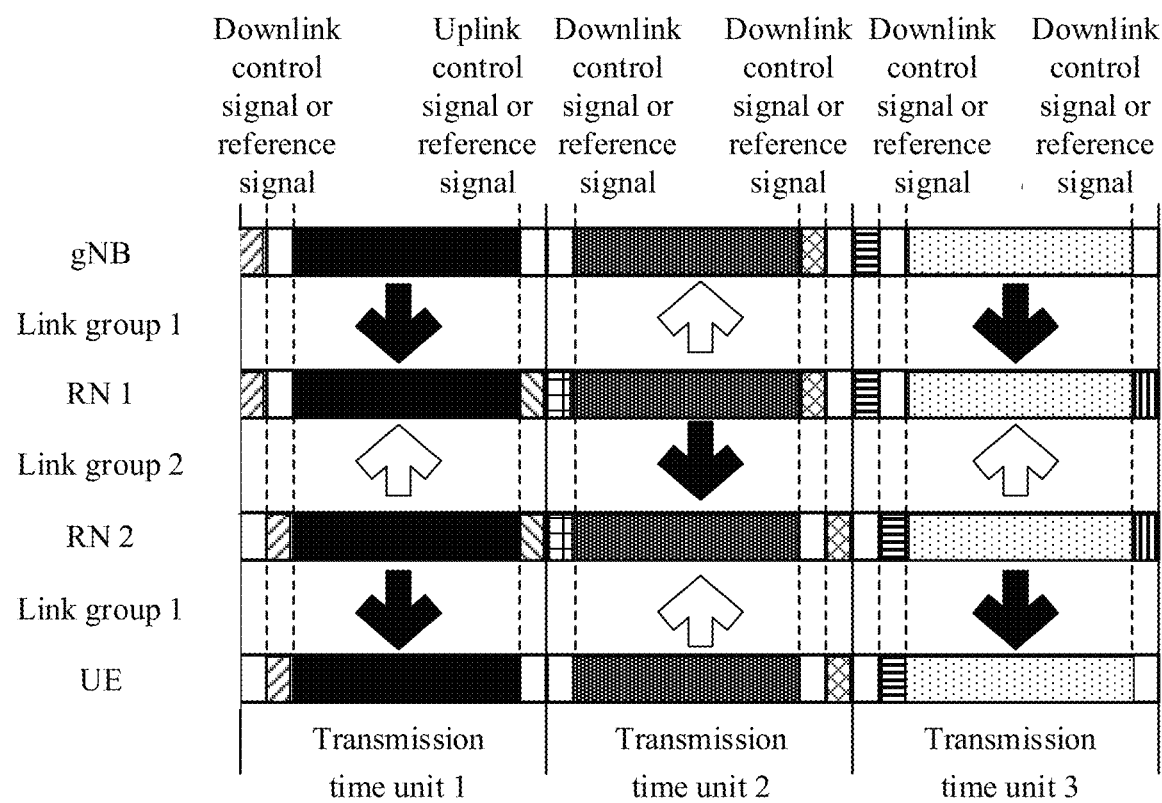
FIG. 10 is a schematic diagram of link groups according to another embodiment of the present invention.

As shown in FIG. 9 and FIG. 10, links in a link group 1 or a link group 2 do not include a same transmission node. In this way, links in the link group 1 and the link group 2 do not interfere with each other, and can perform transmission at the same time. In an example shown in FIG. 9, a backhaul link 1 and an access link that are in the link group 1 and that have entirely non-overlapping nodes may perform SDM transmission, and the backhaul link 1 and a backhaul link 2 that have an overlapping node or the backhaul link 2 and the access link need to perform TDM transmission. In an example shown in FIG. 10, all relay nodes perform SDM transmission. In addition, in the figure, Control/RS represents a control signal or a reference signal, DL Control/RS represents a downlink control signal or a reference signal, and UL Control/RS represents an uplink control signal or a reference signal.

820. The first device sends indication information to the second device, where the indication information is used to indicate the resources of the backhaul link and the access link.

Correspondingly, the second device receives the indication information, performs backhaul link transmission based on the resource of the backhaul link, and performs access link transmission based on the resource of the access link.

The resource herein is a time domain resource, a frequency domain resource, and/or a code domain resource. The first device may be a network device (for example, a base station) or a relay node. The second device may be a relay node or UE.

In this embodiment of the present invention, links in a same link group are transmitted by using different beams, and the resources of the backhaul link and the access link are determined based on a group status of the links, so that resource allocation of the backhaul link and the access link is more flexible, and resource utilization is improved.

Because links in a same link group do not include a same transmission node, the links in the same link group may multiplex a same resource for SDM transmission, thereby helping improve resource utilization.

It should be further understood that, sequence numbers of the foregoing processes do not mean execution sequences. The execution sequences of the processes should be determined according to functions and internal logic of the processes, and should not constitute any limitation on the implementation processes of the embodiments of the present invention.

The embodiments of the present invention further provide apparatus embodiments for implementing steps and methods in the foregoing method embodiments. The methods, steps, technical details, technical effects, and the like in the foregoing method embodiments are also applicable to the apparatus embodiments, and details are not described below again.

Figure 11:
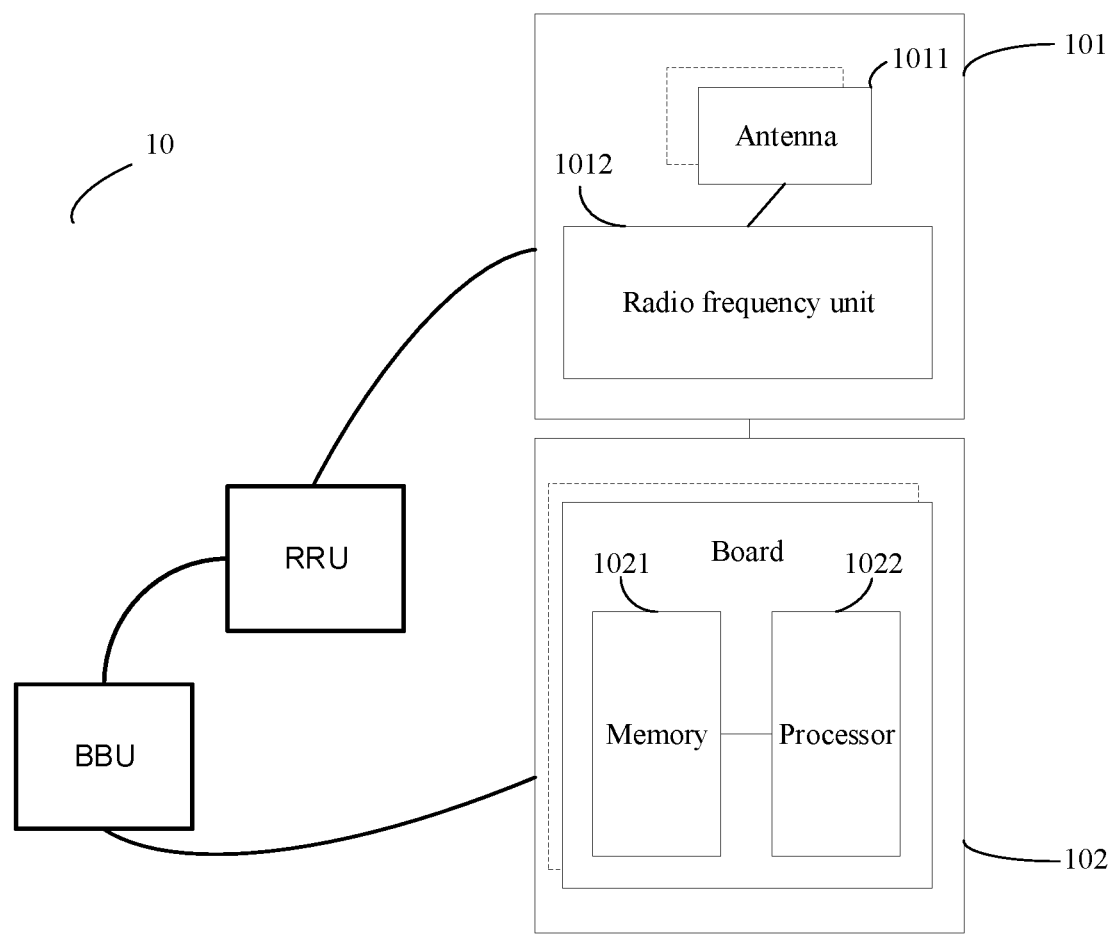
FIG. 11 is a schematic structural diagram of a network device according to an embodiment of the present invention.

FIG. 11 is a schematic structural diagram of a network device 10. The network device may be applied to the system shown in FIG. 1. The network device 10 includes one or more remote radio units (RRU) 101 and one or more baseband units (BBU) 102. The RRU 101 may be referred to as a transceiver unit, a transceiver machine, a transceiver circuit, a transceiver, or the like, and may include at least one antenna 1011 and a radio frequency unit 1012. The RRU 101 part is mainly used for receiving and sending of a radio frequency signal and conversion between a radio frequency signal and a baseband signal, for example, configured to send the signaling indication in the foregoing embodiment to another device (such as a relay node or terminal). The BBU 102 part is mainly configured to: perform baseband processing, control a device, and so on. The RRU 101 and the BBU 102 may be physically disposed together, or may be physically separately disposed, namely, a distributed base station.

The BBU 102 is a control center of the network device, or may be referred to as a processing unit, and is mainly configured to complete baseband processing functions such as channel coding, multiplexing, modulation, and spectrum spreading. In an example, the BBU 102 may include one or more boards, and a plurality of boards may jointly support a radio access network of a single access standard (such as a 5G network), or may separately support radio access networks of different access standards. The BBU 102 further includes a memory 1021 and a processor 1022. The memory 1021 is configured to store a necessary instruction and necessary data. The processor 1022 is configured to control the network device to perform a necessary action. The memory 1021 and the processor 1022 may serve one or more boards. In other words, a memory and a processor may be separately disposed on each board. Alternatively, a plurality of boards may share a same memory and processor. In addition, a necessary circuit is further disposed on each board.

The network device may be configured to implement the method performed by the first device in the method embodiment shown in FIG. 2. Specifically:

The processor is configured to generate first indication information, where the first indication information is used to indicate a first time domain resource of a first link or a second link in an $(n+k_0)^{th}$ time unit to an $(n+k_1)^{th}$ time unit, the first link is a link between a first device and a second device, the second link is a link between the second device and a third device, $k_0$ is an integer greater than or equal to 0 and less than or equal to $k_1$, and $k_1$ is an integer.

The transceiver is configured to send the first indication information.

Optionally, the transceiver is further configured to send second indication information, where the second indication information indicates a second time domain resource of the first link and/or the second link, and the first time domain resource that is of the first link or the second link and that is indicated by the first indication information is located at a location other than the second time domain resource in the $(n+k_0)^{th}$ time unit to the $(n+k_1)^{th}$ time unit.

Optionally, the transceiver is further configured to send third indication information, where the third indication information is used to indicate a first time domain resource set and a second time domain resource set, time domain resources in the first time domain resource set are used for uplink of the first link and downlink of the second link, and the second time domain resource set is used for downlink of the first link and uplink of the second link.

Alternatively, the network device may be configured to implement the method performed by the second device in the method embodiment shown in FIG. 2. Specifically:

The processor is configured to control a transceiver to receive and transmit a signal.

The transceiver is configured to receive first indication information, where the first indication information is used to indicate a first time domain resource of a first link or a second link in an $(n+k_0)^{th}$ time unit to an $(n+k_1)^{th}$ time unit, the first link is a link between a first device and a second device, the second link is a link between the second device and a third device, $k_0$ is an integer greater than or equal to 0 and less than or equal to $k_1$, and $k_1$ is an integer.

Optionally, the transceiver is further configured to send status information of the first link and/or status information of the second link.

Optionally, the transceiver is further configured to receive second indication information, where the second indication information indicates a second time domain resource of the first link and/or the second link, and the first time domain resource that is of the first link or the second link and that is indicated by the first indication information is located at a location other than the second time domain resource in the $(n+k_0)^{th}$ time unit to the $(n+k_1)^{th}$ time unit.

Optionally, the transceiver is further configured to receive third indication information, where the third indication information is used to indicate a first time domain resource set and a second time domain resource set, time domain resources in the first time domain resource set are used for uplink of the first link and downlink of the second link, and the second time domain resource set is used for downlink of the first link and uplink of the second link.

Alternatively, the network device may be configured to implement the method performed by the first device in the method embodiment shown in FIG. 7. Specifically:

The transceiver is configured to receive reporting information, where the reporting information is used to indicate a space division multiplexing type supported by a second device.

The processor is configured to determine, based on the reporting information, the space division multiplexing type supported by the second device.

Optionally, the transceiver is further configured to send first indication information, where the first indication information is used to indicate a space division multiplexing type used by the second device.

Optionally, the transceiver is further configured to send second indication information, where the second indication information is used to indicate one of the following information: a resource that can be used for space division multiplexing between a first link and a second link, a resource that can be used for frequency division multiplexing between the first link and the second link, and a resource that cannot be used for space division multiplexing and frequency division multiplexing between the first link and the second link.

Optionally, the transceiver is further configured to send third indication information, where the third indication information is used to indicate at least one of the following resource sets: a resource set that cannot be used for an access link, a candidate resource set of a reference signal, a control channel, and/or a shared channel of the second link, and a candidate resource set of a reference signal, a control channel, and/or a shared channel of the first link.

Alternatively, the network device may be configured to implement the method performed by the first device in the method embodiment shown in FIG. 8. Specifically:

The processor is configured to: determine a plurality of link groups of a link on which a second device is located, and determine resources of a backhaul link and an access link based on the plurality of link groups.

The transceiver is configured to send indication information, where the indication information is used to indicate the resources of the backhaul link and the access link.

Figure 12:
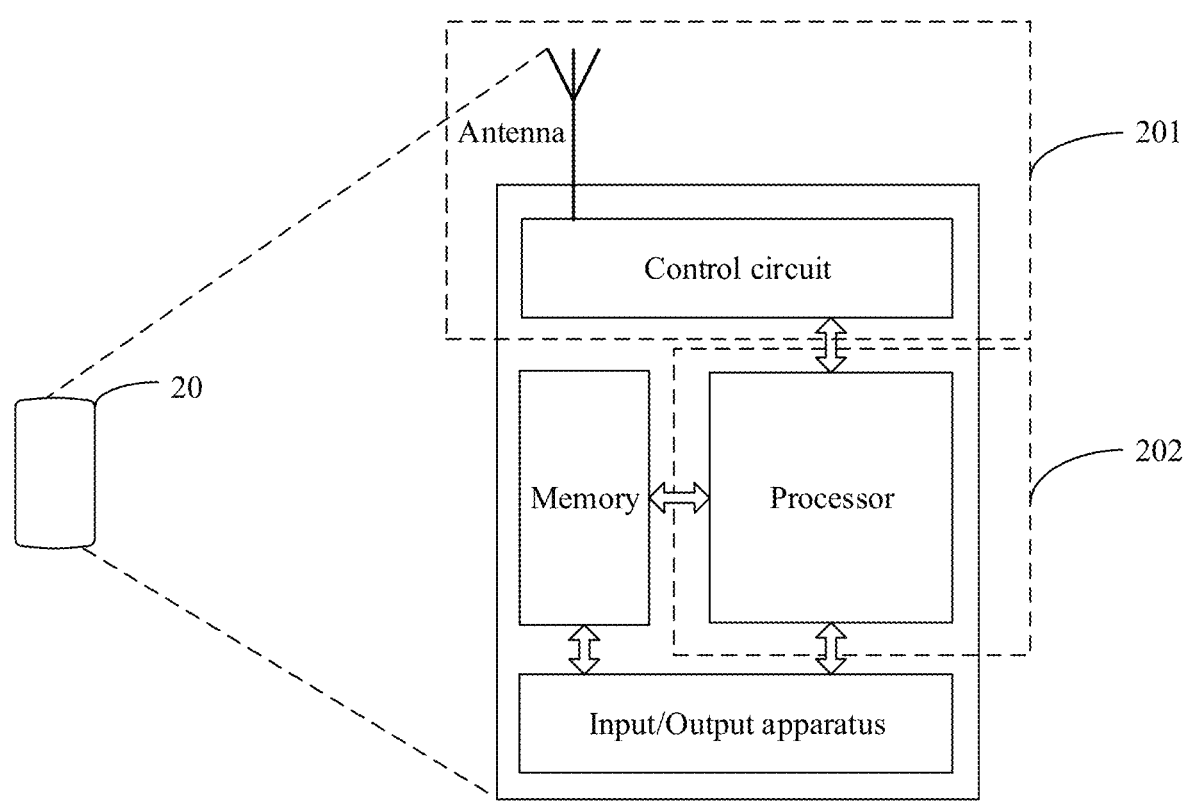
FIG. 12 is a schematic structural diagram of a terminal according to another embodiment of the present invention.

FIG. 12 is a schematic structural diagram of a terminal 20. The terminal may be applicable to the system shown in FIG. 1. For ease of description, FIG. 12 shows only main components of the terminal 20. As shown in FIG. 12, the terminal 20 includes a processor, a memory, a control circuit or an antenna, and an input/output apparatus. The processor is mainly configured to: process a communication protocol and communication data, control the entire terminal, execute a software program, and process data of the software program. The memory is mainly configured to store a software program and data, for example, store a codebook described in the foregoing embodiments. The control circuit is mainly configured to perform conversion between a baseband signal and a radio frequency signal, and process the radio frequency signal. A combination of the control circuit and the antenna may also be referred to as a transceiver that is mainly configured to receive and transmit a radio frequency signal in an electromagnetic wave form. The input/output apparatus, such as a touchscreen, a display, or a keyboard, is mainly configured to: receive data entered by a user, and output data to the user.

After the terminal is powered on, the processor may read the software program in the storage unit, interpret and execute an instruction of the software program, and process the data of the software program. When data needs to be sent in a wireless manner, the processor performs baseband processing on the to-be-sent data, and outputs a baseband signal to a radio frequency circuit. After performing radio frequency processing on the baseband signal, the radio frequency circuit sends the radio frequency signal by using the antenna in an electromagnetic wave form. When data is sent to the terminal, the radio frequency circuit receives the radio frequency signal through the antenna, converts the radio frequency signal into a baseband signal, and outputs the baseband signal to the processor. The processor converts the baseband signal into data, and processes the data.

A person skilled in the art may understand that, for ease of description, FIG. 12 shows only one memory and one processor. An actual terminal may include a plurality of processors and a plurality of memories. The memory may also be referred to as a storage medium, a storage device, or the like. This is not limited in this embodiment of the present invention.

In an optional embodiment, the processor may include a baseband processor and a central processing unit. The baseband processor is mainly configured to process a communication protocol and communication data, and the central processing unit is mainly configured to: control the entire terminal, execute a software program, and process data of the software program. The processor in FIG. 12 integrates functions of the baseband processor and the central processing unit. A person skilled in the art may understand that the baseband processor and the central processing unit may be individually independent processors, and are interconnected by using a technology such as a bus. A person skilled in the art may understand that the terminal may include a plurality of baseband processors to adapt to different network standards, and the terminal may include a plurality of central processing units to enhance a processing capability of the terminal. The components in the terminal may be connected by using various buses. The baseband processor may also be expressed as a baseband processing circuit or a baseband processing chip. The central processing unit may alternatively be expressed as a central processing circuit or a central processing chip. A function of processing the communication protocol and the communication data may be embedded into the processor, or may be stored in the storage unit in a form of a software program. The processor executes the software program to implement a baseband processing function.

For example, in this embodiment of the present invention, the antenna and the control circuit that have a receiving/sending function may be considered as a transceiver unit 201 of the terminal 20, and the processor having a processing function may be considered as a processing unit 202 of the terminal 20. As shown in FIG. 12, the terminal 20 includes the transceiver unit 201 and the processing unit 202. The transceiver unit may also be referred to as a transceiver, a transceiver machine, a transceiver apparatus, or the like. Optionally, a component that is in the transceiver unit 201 and that is configured to implement a receiving function may be considered as a receiving unit, and a component that is in the transceiver unit 201 and that is configured to implement a sending function may be considered as a sending unit. In other words, the transceiver unit 201 includes the receiving unit and the sending unit. For example, the receiving unit may also be referred to as a receiver machine, a receiver, a receiver circuit, or the like, and the sending unit may be referred to as a transmitter machine, a transmitter, a transmitter circuit, or the like.

The terminal may be configured to implement the method performed by the second device in the method embodiment shown in FIG. 2. Specifically:

The processor is configured to control a transceiver to receive and transmit a signal.

The transceiver is configured to receive first indication information, where the first indication information is used to indicate a first time domain resource of a first link or a second link in an $(n+k_0)^{th}$ time unit to an $(n+k_1)^{th}$ time unit, the first link is a link between a first device and a second device, the second link is a link between the second device and a third device, $k_0$ is an integer greater than or equal to 0 and less than or equal to $k_1$, and $k_1$ is an integer.

Optionally, the transceiver is further configured to send status information of the first link and/or status information of the second link.

Optionally, the transceiver is further configured to receive second indication information, where the second indication information indicates a second time domain resource of the first link and/or the second link, and the first time domain resource that is of the first link or the second link and that is indicated by the first indication information is located at a location other than the second time domain resource in the $(n+k_0)^{th}$ time unit to the $(n+k_1)^{th}$ time unit.

Optionally, the transceiver is further configured to receive third indication information, where the third indication information is used to indicate a first time domain resource set and a second time domain resource set, time domain resources in the first time domain resource set are used for uplink of the first link and downlink of the second link, and the second time domain resource set is used for downlink of the first link and uplink of the second link.

Alternatively, the terminal may be configured to implement the method performed by the second device in the method embodiment shown in FIG. 7. pecifically:

The processor is configured to generate reporting information, where the reporting information is used to indicate a space division multiplexing type supported by a terminal.

The transceiver is configured to send the reporting information.

Optionally, the transceiver is further configured to receive first indication information, where the first indication information is used to indicate a space division multiplexing type used by the second device.

Optionally, the transceiver is further configured to receive second indication information, where the second indication information is used to indicate one of the following information: a resource that can be used for space division multiplexing between the first link and the second link, a resource that can be used for frequency division multiplexing between the first link and the second link, and a resource that cannot be used for space division multiplexing and frequency division multiplexing between the first link and the second link.

Optionally, the transceiver is further configured to receive third indication information, where the third indication information is used to indicate at least one of the following resource sets: a resource set that cannot be used for an access link, a candidate resource set of a reference signal, a control channel, and/or a shared channel of the second link, and a candidate resource set of a reference signal, a control channel, and/or a shared channel of the first link.

Alternatively, the network device may be configured to implement the method performed by the second device in the method embodiment shown in FIG. 8. Specifically:

The transceiver is configured to receive indication information, where the indication information is used to indicate resources of a backhaul link and an access link.

The processor is configured to control, based on the resources of the backhaul link and the access link, the transceiver to receive and transmit a signal.

All or some of the foregoing embodiments may be implemented by using software, hardware, firmware, or any combination thereof. When software is used to implement the embodiments, all or some of the embodiments may be implemented in a form of a computer program product. The computer program product includes one or more computer instructions. When the computer program instructions are loaded and executed on the computer, all or some of the procedure or functions according to the embodiments of the present invention are generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a web site, computer, server, or data center to another web site, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, including one or more usable media. The usable medium may be a magnetic medium (for example, a floppy disk, a hard disk, or a magnetic tape), an optical medium (for example, a DVD), a semiconductor medium (for example, a solid-state drive (Solid State Disk, SSD)), or the like.

What is claimed is:

1. A resource indication method, comprising:
    sending, by a first device, first indication information to a second device in an $n^{th}$ time unit, wherein the first indication information indicates a first time domain resource of a first link or a second link in an $(n+k_0)^{th}$ time unit to an $(n+k_1)^{th}$ time unit, wherein the first link is a link between the first device and the second device, the second link is a link between the second device and a third device, the second device implements a relay function between the first link and the second link, $k_0$ is an integer greater than or equal to 0 and less than or equal to $k_1$, and $k_1$ is an integer, wherein
    time domain resources of the second link comprise a first-type time domain resource and a second-type time domain resource of the second link, and a location of the first-type time domain resource of the second link and a location of the second-type time domain resource of the second link in time domain meet a preset relationship that comprises a meeting of the location of the first-type time domain resource of the second link and the location of the second-type time domain resource of the second link in a time domain, wherein the second-type time domain resource of the second link is used to transmit feedback information that is a feedback to information transmitted on some or all time domain resources in the first-type time domain resource of the second link, and wherein the first device determines the second-type time domain resource of the second link based on the preset relationship; and
    sending, by the first device, third indication information to the second device, wherein the third indication information indicates a first time domain resource set and a second time domain resource set, time domain resources in the first time domain resource set are used for uplink of the first link and downlink of the second link, the second time domain resource set is used for downlink of the first link and uplink of the second link, and the third indication information indicates at least a resource set that cannot be used for the first link or the second link.

2. The method according to claim 1, further comprising:
    sending, by the first device, second indication information to the second device, wherein the second indication information indicates a second time domain resource of the first link and/or the second link, and the first time domain resource of the first link or the second link and that is indicated by the first indication information is located at a location other than the second time domain resource in the $(n+k_0)^{th}$ time unit to the $(n+k_1)^{th}$ time unit.

3. The method according to claim 1, wherein
    the first indication information comprises one of the following information: an identifier of the first time domain resource of the first link or the second link in a plurality of groups of candidate time domain resources, information about a proportion of the first time domain resource of the first link or the second link in the $(n+k_0)^{th}$ time unit to the $(n+k_1)^{th}$ time unit, and switching locations of the first time domain resources of the first link and the second link in the $(n+k_0)^{th}$ time unit to the $(n+k_1)^{th}$ time unit.

4. The method according to claim 1, wherein
the first indication information indicates that a time unit in the $(n+k_0)^{th}$ time unit to the $(n+k_1)^{th}$ time unit is the first time domain resource of the first link or the second link.

5. The method according to claim 1, further comprising:
receiving, by the first device, status information of the first link and/or the second link and that is sent by the second device, wherein the status information comprises channel state information and/or load information.

6. The method according to claim 1, wherein the third indication information further indicates at least (a) a candidate resource set of a reference signal, a control channel, and/or a shared channel of the second link, (b) a candidate resource set of a reference signal, a control channel, and/or a shared channel of the first link, or (c) a combination thereof.

7. A communications device, comprising:
a processor configured to generate first indication information, wherein the first indication information indicates a first time domain resource of a first link or a second link in an $(n+k_0)^{th}$ time unit to an $(n+k_1)^{th}$ time unit, wherein the first link is a link between the communications device and a second device, the second link is a link between the second device and a third device, the second device implements a relay function between the first link and the second link, ko is an integer greater than or equal to 0 and less than or equal to $k_1$, and $k_1$ is an integer, wherein
time domain resources of the second link comprise a first-type time domain resource and a second-type time domain resource of the second link, and a location of the first-type time domain resource of the second link and a location of the second-type time domain resource of the second link in time domain meet a preset relationship that comprises a meeting of the location of the first-type time domain resource of the second link and the location of the second-type time domain resource of the second link in a time domain, wherein the second-type time domain resource of the second link is used to transmit feedback information that is a feedback to information transmitted on some or all time domain resources in the first-type time domain resource of the second link, and wherein the communications device determines the second-type time domain resource of the second link based on the preset relationship; and
a transceiver configured to send the first indication information in an nth time unit, and wherein
the transceiver is further configured to send third indication information, wherein the third indication information indicates a first time domain resource set and a second time domain resource set, time domain resources in the first time domain resource set are used for uplink of the first link and downlink of the second link, the second time domain resource set is used for downlink of the first link and uplink of the second link, and the third indication information indicates at least a resource set that cannot be used for the first link or the second link.

8. The communications device according to claim 7, wherein
the processor is further configured to generate second indication information, wherein the second indication information indicates a second time domain resource of the first link and/or the second link, and the first time domain resource of the first link or the second link and that is indicated by the first indication information is located at a location other than the second time domain resource in the $(n+k_0)^{th}$ time unit to the $(n+k_1)^{th}$ time unit; and
the transceiver is further configured to send the second indication information.

9. The communications device according to claim 7, wherein
the first indication information comprises one of the following information: an identifier of the first time domain resource of the first link or the second link in a plurality of groups of candidate time domain resources, information about a proportion of the first time domain resource of the first link or the second link in the $(n+k_0)^{th}$ time unit to the $(n+k_1)^{th}$ time unit, and switching locations of the first time domain resources of the first link and the second link in the $(n+k_0)^{th}$ time unit to the $(n+k_1)^{th}$ time unit.

10. The communications device according to claim 7, wherein
the first indication information indicates that a time unit in the $(n+k_0)^{th}$ time unit to the $(n+k_1)^{th}$ time unit is the first time domain resource of the first link or the second link.

11. The communications device according to claim 7, wherein
the transceiver is further configured to receive status information of the first link and/or the second link and that is sent by the second device, wherein the status information comprises channel state information and/or load information.

12. A communications device for use as a second device in a system network comprising a first device, the second device, and a third device, comprising:
a transceiver configured to receive first indication information, wherein the first indication information indicates a first time domain resource of a first link or a second link in an $(n+k_0)^{th}$ time unit to an $(n+k_1)^{th}$ time unit, wherein the first link is a link between the first device and the second device, the second link is a link between the second device and the third device, the second device implements a relay function between the first link and the second link, $k_0$ is an integer greater than or equal to 0 and less than or equal to ki, and ki is an integer, wherein
time domain resources of the second link comprise a first-type time domain resource and a second-type time domain resource of the second link, and a location of the first-type time domain resource of the second link and a location of the second-type time domain resource of the second link in time domain meet a preset relationship that comprises a meeting of the location of the first-type time domain resource of the second link and the location of the second-type time domain resource of the second link in a time domain, wherein the second-type time domain resource of the second link is used to transmit feedback information that is a feedback to information transmitted on some or all time domain resources in the first-type time domain resource of the second link, and wherein the second-type time domain resource of the second link is based on the preset relationship as determined by the first device; and
wherein the transceiver is further configured to receive third indication information sent by the first device, wherein the third indication information indicates a first time domain resource set and a second time domain resource set, time domain resources in the first time domain resource set are used for uplink of the first link and downlink of the second link, the second time domain resource set is used for downlink of the first link and uplink of the second link, and the third indication information indicates at least a resource set that cannot be used for the first link or the second link.

13. The communications device according to claim 12, wherein the transceiver is further configured to receive second indication information, wherein the second indication information indicates a second time domain resource of the first link and/or the second link, and the first time domain resource of the first link or the second link and that is indicated by the first indication information is located at a location other than the second time domain resource in the $(n+k_0)^{th}$ time unit to the $(n+k_1)^{th}$ time unit.

14. The communications device according to claim 12, wherein the first indication information further indicates a type of the first time domain resource of the first link or the second link, the type of the first time domain resource of the first link is a time domain resource used for uplink or downlink of the first link, and the type of the first time domain resource of the second link is a time domain resource used for uplink or downlink of the second link.

15. The communications device according to claim 12, wherein the first indication information comprises one of the following information: an identifier of the first time domain resource of the first link or the second link in a plurality of groups of candidate time domain resources, information about a proportion of the first time domain resource of the first link or the second link in the $(n+k_0)^{th}$ time unit to the $(n+k_1)^{th}$ time unit, and switching locations of the first time domain resource of the first link and the first time domain resource of the second link in the $(n+k_0)^{th}$ time unit to the $(n+k_1)^{th}$ time unit.

16. The communications device according to claim 12, wherein the first indication information indicates that a time unit in the $(n+k_0)^{th}$ time unit to the $(n+k_1)^{th}$ time unit is the first time domain resource of the first link or the second link.

\* \* \* \* \*

UNITED STATES PATENT AND TRADEMARK OFFICE
CERTIFICATE OF CORRECTION

| | |
|---|---|
| PATENT NO. | : 11,463,226 B2 |
| APPLICATION NO. | : 16/670188 |
| DATED | : October 4, 2022 |
| INVENTOR(S) | : Yi Qin et al. |

It is certified that error appears in the above-identified patent and that said Letters Patent is hereby corrected as shown below:

In the Claims

In Claim 12, Column 26, Line 43, "less than or equal to ki , and ki" and should be --less than or equal to k1, and k1--.

Signed and Sealed this
Thirty-first Day of January, 2023

Katherine Kelly Vidal
*Director of the United States Patent and Trademark Office*